United States Patent
Spurk et al.

(10) Patent No.: US 8,226,914 B2
(45) Date of Patent: Jul. 24, 2012

(54) CATALYST SYSTEM AND USE THEREOF

(75) Inventors: Paul Spurk, Weiterstadt (DE);
Stèphanie Frantz, Hanau (DE);
Thomas Le Tallec, Sartrouville (FR);
Olivier Teysset, Poissy (FR); Wilfried Mueller, Karben (DE); Gerald Jeske, Neuberg (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 351 days.

(21) Appl. No.: 12/527,724

(22) PCT Filed: Feb. 20, 2008

(86) PCT No.: PCT/EP2008/001298
§ 371 (c)(1),
(2), (4) Date: Dec. 30, 2009

(87) PCT Pub. No.: WO2008/101675
PCT Pub. Date: Aug. 28, 2008

(65) Prior Publication Data
US 2010/0095658 A1 Apr. 22, 2010

(30) Foreign Application Priority Data
Feb. 21, 2007 (DE) .......... 10 2007 008 954

(51) Int. Cl.
*B01D 53/62* (2006.01)
*B01D 53/72* (2006.01)
*B01D 53/94* (2006.01)
*F01N 3/10* (2006.01)
*F01N 3/24* (2006.01)

(52) U.S. Cl. .......... 423/213.2; 423/213.5; 423/213.7; 60/299

(58) Field of Classification Search .......... 60/299; 423/213.2, 213.5, 213.7
See application file for complete search history.

(56) References Cited

U.S. PATENT DOCUMENTS
5,829,250 A 11/1998 Lane et al.
(Continued)

FOREIGN PATENT DOCUMENTS
DE 0405310 2/1991
(Continued)

OTHER PUBLICATIONS
International Search Report (PCT/EP2008/001298) Jul. 7, 2008.
(Continued)

*Primary Examiner* — Timothy Vanoy
(74) *Attorney, Agent, or Firm* — Kalow & Springut LLP

(57) ABSTRACT

Soot filters for removing soot from the exhaust gas of lean-burn engines become blocked with progressive operating duration on account of the deposition of soot, and must therefore be regenerated at regular intervals. It has been found that reliable operation of the soot filter is possible only if an active regeneration is carried out from time to time by increasing the exhaust-gas temperature to the soot ignition temperature. For this purpose, an oxidation catalytic converter is usually arranged upstream of the soot filter, and the exhaust-gas temperature is increased by means of the catalytic combustion of additionally injected fuel. Here, the oxidation catalytic converter is subjected to high temperature loading and therefore ages very quickly. It has surprisingly been found that the ageing of the oxidation catalytic converter can be slowed if said oxidation catalytic converter is split into at least two separate catalytic converters and the distance between said separate catalytic converters is 2 to 30 mm.

12 Claims, 1 Drawing Sheet

U.S. PATENT DOCUMENTS

| | | | |
|---|---|---|---|
| 5,846,502 A * | 12/1998 | Bourke | 423/213.5 |
| 6,877,313 B1 | 4/2005 | Phillips et al. | |
| 2003/0099583 A1 | 5/2003 | Ikeda et al. | |
| 2005/0262830 A1* | 12/2005 | Pott et al. | 60/282 |
| 2011/0088377 A1* | 4/2011 | Katoh et al. | 60/299 |
| 2011/0258989 A1* | 10/2011 | Hirota et al. | 60/286 |

FOREIGN PATENT DOCUMENTS

| | | |
|---|---|---|
| DE | 9210010 U1 | 3/1992 |
| DE | 102005017378 A1 | 2/2005 |
| DE | 102005017378 A1 | 11/2006 |
| DE | 102007008954 B4 | 12/2009 |
| EP | 0341832 A | 11/1998 |
| EP | 1640056 A2 | 3/2006 |

OTHER PUBLICATIONS

Written Opinion (PCT/EP2008/001298) Jul. 7, 2008.

Bressler, et al "Multiple Disc Catalytic Converters-An Innovative Approach for Improved Conversion at a Lower Cost". Sae Technical Paper Series 940936, Feb. 28-Mar. 3 (1994).

German Opposition Patent No. DE 10 2007 008 954 B4 mailed Mar. 17, 2010.

German Opposition Patent No. DE 10 2007 008 954 B4 mailed Jun. 9, 2010.

English Translation Written Opinion (PCT/EP2008/001298) Sep. 8, 2009.

* cited by examiner

CATALYST SYSTEM AND USE THEREOF

FIELD OF THE INVENTION

The present invention relates to a catalytic converter system and the use thereof for the purification of the exhaust gases of an internal combustion engine, which catalytic converter system comprises, in a common converter housing, at least two catalytic converters which are arranged in series, and at a distance from one another, in the flow direction of the exhaust gas and which can catalytically burn hydrocarbons and carbon monoxide in lean exhaust gas. The catalytic converter system is used in the exhaust system of a diesel engine to heat the exhaust gas to a soot ignition temperature for the active regeneration of a soot filter which is situated downstream.

BACKGROUND OF THE INVENTION

The soot generated by diesel engines must be removed from the exhaust gas by means of soot filters in order to prevent air pollution. With increasing deposition of soot in the filter, the exhaust-gas back pressure generated by the filter increases and reduces the power of the engine. The filter must therefore be regenerated regularly by burning off the soot.

The regeneration poses a problem in particular in modern diesel engines, since the exhaust gas of said engines in normal operation is too cold to ignite the combustion of the soot on the filter. Exhaust-gas temperatures of 500 to 700° C. would be necessary for this purpose.

Passive and active methods for the regeneration of soot filters are known. In the passive method, for example according to EP 0 341 832 A2, a soot filter is oxidized continuously at exhaust-gas temperatures of below 400° C. by means of nitrogen oxide as an oxidant. For this purpose, an oxidation catalytic converter is arranged upstream of the soot filter, which oxidation catalytic converter converts the nitrogen monoxide which is present in the exhaust gas into nitrogen dioxide. Said method requires that the exhaust gas contains sufficient quantities of nitrogen monoxide. It is a disadvantage that the presence of hydrocarbons in the exhaust gas hinders the oxidation of nitrogen monoxide to nitrogen dioxide. This shortcoming can be remedied, according to U.S. Pat. No. 6,877,313 B1, by virtue of two oxidation catalytic converters being arranged upstream of the soot filter, with the first catalytic converter substantially burning the hydrocarbons in the exhaust gas, and the second catalytic converter oxidizing the remaining nitrogen oxides in the exhaust gas to nitrogen dioxide.

Passive methods cannot ensure reliable operation of the soot filter. The filter must be actively regenerated at least from time to time. For this purpose, fuel is injected into the exhaust-gas flow upstream of the oxidation catalytic converter and is burned on the oxidation catalytic converter, or the concentration of unburned hydrocarbons in the exhaust gas is increased by means of engine-internal measures. Depending on the present operating state of the engine, the catalytic combustion in the oxidation catalytic converter must heat the exhaust gas by 200 to 400° C. to reach the soot ignition temperature. Here, high temperature peaks occur in the interior of the oxidation catalytic converter, which temperature peaks can lead to premature ageing of the catalytic converter. As a result, with progressive operating duration, the conversion of the hydrocarbons and of carbon monoxide on the oxidation catalytic converter deteriorates.

DE 10 2005 017 378 A1 describes an exhaust-gas purification device having a catalytic converter body which is composed of a plurality of catalytic converter discs arranged in series in the flow direction of the exhaust gas. The catalytic converter discs are composed of a sintered metal powder for the conversion of the hydrocarbons, carbon monoxide and nitrogen oxides which are contained in the exhaust gas to form carbon dioxide, water and nitrogen. The distance between the catalytic converter discs is approximately 3 mm.

US 2003/0099583 A1 describes an exhaust-gas purification device which comprises a three-way catalytic converter A, for converting hydrocarbons, carbon monoxide and nitrogen oxides in the stoichiometric exhaust gas, and also a catalytic converter B which is arranged downstream and which has zeolites for absorbing hydrocarbons.

SUMMARY OF THE INVENTION

It is an object of the present invention to specify a catalytic converter system which undergoes reduced ageing during the catalytic combustion of hydrocarbons, and which can therefore be advantageously used for the active regeneration of soot filters.

Said object is achieved by means of a catalytic converter system which comprises, in a common converter housing, at least two catalytic converters and which are arranged in series, and at a distance from one another, in the flow direction of the exhaust gas and which can catalytically burn hydrocarbons and carbon monoxide in lean exhaust gas. The catalytic converter system is characterized in that the distance between two adjacent catalytic converters is between 2 and 30 mm.

It has been found that the ageing of a catalytic converter during the catalytic combustion can be slowed if said catalytic converter is split into at least two individual catalytic converters and said individual catalytic converters are arranged at a small distance of only a few millimeters from one another. This result is surprising since the small distance of only a few millimeters between the successive catalytic converters cannot cool the exhaust gas. It is evidently the case that the separation of the catalytic converters has a positive effect on the temperature distribution in the catalytic converters. As a result, temperature peaks which would lead to fast ageing of the catalytic converter are avoided.

DETAILED DESCRIPTION OF THE PREFERRED EMBODIMENTS

Figure 1:
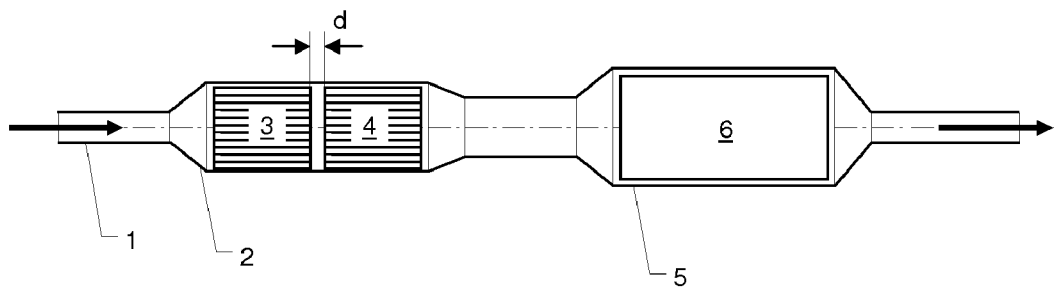
FIG. 1: shows the design of an exhaust system having a soot filter and having the catalytic converter system according to the invention for the active regeneration of the filter.

The hydrocarbons required for the catalytic combustion may either be injected into the exhaust-gas flow by means of a dosing device arranged upstream of the first catalytic converter, or the portion of unburned hydrocarbons in the exhaust gas of the engine may be increased by means of engine-internal measures, for example by means of a post-injection of fuel into the cylinders of the engine.

For the catalytic converter system, any catalytic converter which can oxidize hydrocarbons in the lean exhaust gas are suitable; these include in particular oxidation catalytic converters and three-way catalytic converters, which may also be used in combination.

The catalytic converters preferably comprise an oxidation-active catalyst coating applied to a ceramic or metallic honeycomb body, which catalyst coating comprises at least one precious metal from the group comprising platinum, palladium and rhodium on substrate materials from the group comprising active aluminium oxide, silicon oxide, titanium oxide, zirconium oxide, cerium oxide and mixtures or mixed oxides thereof. In order to store hydrocarbons, the catalytic converter coating may additionally have zeolites. The two catalytic converters may have identical or different compositions.

The catalytic converter system is preferably used in the exhaust section of a diesel engine to heat up the lean exhaust gas to a temperature between 500 and 700° C. downstream of the final catalytic converter by means of the combustion of fuel on the catalytic converters. The fuel required for this purpose may be injected into the exhaust-gas flow upstream of the first catalytic converter by means of the dosing device, wherein it should be ensured that the net exhaust-gas composition continues to have oxidizing properties. Alternatively, the proportion of unburned hydrocarbons in the exhaust gas may be increased by engine-internal measures, for example by means of a post-injection of fuel into the cylinders of the diesel engine, wherein it should again be ensured that the net exhaust-gas composition continues to have oxidizing properties. A soot filter which is arranged downstream of the catalytic converter system can be actively regenerated with the exhaust gas which is heated in this way.

The purpose of the proposed catalytic converter system is to heat the exhaust gas preferably to a temperature of over 500° C., and up to 700° C., by means of the combustion of combustible components of the exhaust gas which are contained in the exhaust gas or which are supplied separately. Combustible components contained in the exhaust gas are for example unburned or incompletely burned hydrocarbons from the diesel fuel, and carbon monoxide.

The distance between the two catalytic converters surprisingly results in slower ageing of the catalytic converter system, which manifests itself in an improved conversion of carbon monoxide and hydrocarbons after ageing has taken place. The catalytic converter system according to the invention therefore has lower emissions of carbon monoxide and hydrocarbons after ageing has taken place than a corresponding single-piece catalytic converter or than two catalytic converters arranged in series without a spacing.

On the one hand, the distance between the catalytic converter may not be too small, so as to ensure the observed effect; on the other hand, an excessively large distance should be avoided for spatial and thermal reasons, since with increasing distance, the exhaust gas is cooled between the catalytic converters. For common cross-sectional dimensions of motor vehicle exhaust-gas catalytic converters with diameters of between 10 and 20 centimeters, a distance between the two catalytic converters of 2 to 30 mm has proven to be expedient. A distance of between 5 and 20 mm is preferably selected.

However, the distance between the two catalytic converters has an influence only on the ageing of the catalytic converter which is situated downstream in the exhaust-gas flow. To improve the ageing stability of the upstream catalytic converter, therefore, as temperature-stable a catalytic converter system as possible should be selected. From experience, a catalytic converter which comprises platinum in combination with palladium withstands high temperatures better than a purely platinum catalytic converter. The platinum/palladium ratio of the first, or upstream, catalytic converter should preferably lie between 4:1 and 1:1. The second catalytic converter has the task of burning as completely as possible the carbon monoxide and the hydrocarbons which are not fully converted by the first catalytic converter. A platinum/palladium catalytic converter which has a lower palladium content than in the first catalytic converter, or a pure platinum catalytic converter, is suitable for this purpose.

The catalytic converter coatings of the two catalytic converters may thus have different compositions from one another in order to optimally perform their respective function in the catalytic converter system. It is however preferable for the two catalytic converter coatings to be identical.

The untreated emissions of a diesel engine during the cold-start phase are composed substantially of unburned hydrocarbons. During the cold-start phase, said components cannot be converted by the catalytic converters, which are still cold. To prevent said emissions, the upstream and/or the downstream catalytic converter of the catalytic converter system according to the invention may contain zeolites which temporarily store the hydrocarbons. With increasing temperature of the exhaust gas, the stored hydrocarbons are desorbed again and can then be converted by the catalytic converters, which are active at the higher temperatures.

Figure 2:
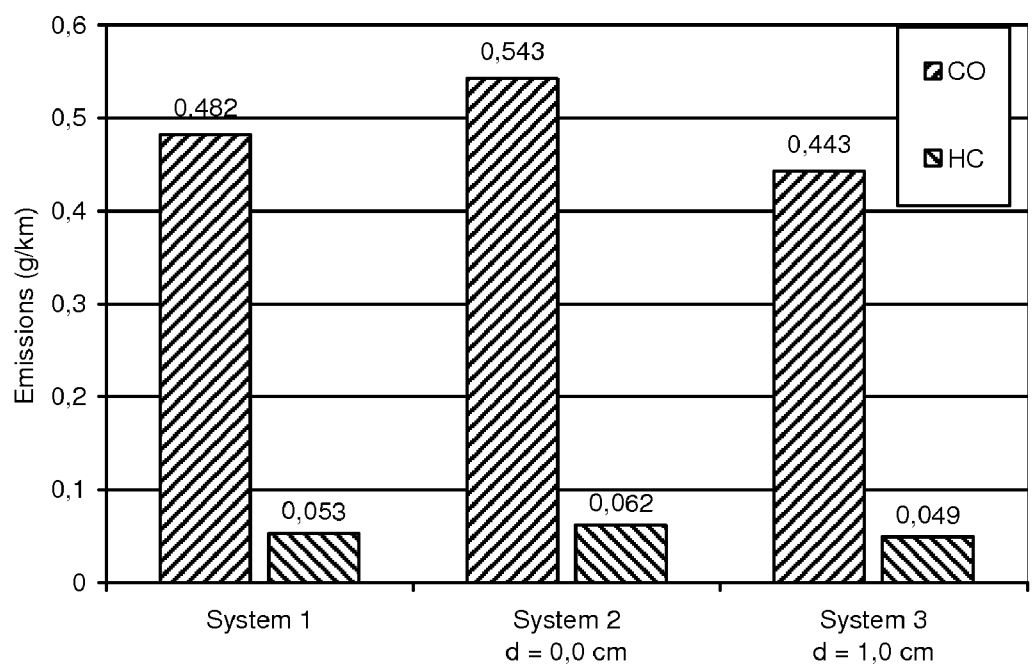
FIG. 2: shows a comparison of the emissions of three different catalytic converter systems.

The invention is explained in more detail below on the basis of an example and the two figures, in which:

FIG. 1: shows the design of an exhaust system having a soot filter and having the catalytic converter system according to the invention for the active regeneration of the filter FIG. 2: shows a comparison of the emissions of three different catalytic converter systems The figure shows an exhaust system (1) of a diesel engine. The exhaust system comprises a first converter housing (2) in which are situated two oxidation-active catalytic converters (3) and (4) which are spaced apart from one another. The distance d between the two catalytic converters lies in the range between 2 and 30 mm. The two catalytic converters may be of equal or different length. A second converter housing (5) with a soot filter (6) is situated downstream of the catalytic converter system. The downstream soot filter can be actively regenerated by means of the combustion of additional fuel in the catalytic converter system.

EXAMPLE

Three catalytic converter systems were compared with one another, with regard to their residual emissions in the New European Driving Cycle (NEDC), on a diesel vehicle with 2.2 liter swept volume. As catalytic converter substrates, use was made in each case of honeycomb bodies composed of cordierite with a cell density of 62 $cm^{-2}$ and a thickness of the duct walls of 0.17 mm, which honeycomb bodies were coated with a conventional diesel oxidation catalyst with 3.18 g platinum per liter honeycomb body volume.

System 1: single-piece honeycomb body diameter 14.4 cm; length 8.9 cm

System 2: two honeycomb bodies diameter 14.4 cm; length of each honeycomb body 4.45 cm; distance d between the honeycomb bodies: 0.00 cm System 3: two honeycomb bodies according to the invention diameter 14.4 cm; length of each honeycomb body 4.45 cm; distance d between the honeycomb bodies: 1 cm The catalytic converter systems were aged for 21 hours by means of post-injection under conditions close to reality. The residual emissions of said catalytic converter systems were thereafter measured on a diesel vehicle in the NEDC. The results are illustrated in FIG. 2.

The catalytic converter system 3 according to the invention exhibits considerably reduced CO and HC emissions during the test than the conventional single-piece system 1 and the system 2 which has two honeycomb bodies without a spacing between the honeycomb bodies.

What is claimed is:

1. A catalytic converter system for the purification of the exhaust gases of an internal combustion engine, comprising, in a common converter housing, at least two catalytic converters, which are arranged in series, and at a distance d from one another, in the flow direction of the exhaust gas and which can catalytically burn hydrocarbons and carbon monoxide in lean exhaust gas, characterized in that the distance d between two adjacent catalytic converters is between 2 and 30 mm, wherein the catalytic converters are oxidation catalytic converters or a combination of oxidation catalytic converters and three-way catalytic converters and further comprising a soot filter, wherein said soot filter is located downstream of said common converter housing.

2. A catalytic converter system according to claim 1, characterized in that a dosing device for injecting fuel into the exhaust gas is arranged upstream of the first catalytic converter.

3. A catalytic converter system according to claim 1, characterized in that the oxidation catalytic converters comprise an oxidation-active catalyst coating applied to ceramic or metallic honeycomb bodies.

4. A catalytic converter system according to claim 3, characterized in that the catalyst coating comprises at least one precious metal from the group comprising platinum, palladium and rhodium on substrate materials from the group comprising active aluminum oxide, silicon oxide, titanium oxide, zirconium oxide, cerium oxide and mixtures or mixed oxides thereof.

5. A catalytic converter system according to claim 4, characterized in that the catalyst coating of that catalytic converter which is upstream in the flow direction of the exhaust gas comprises platinum in combination with palladium.

6. A catalytic converter system according to claim 5, characterized in that the catalyst coating of that catalytic converter which is downstream in the flow direction of the exhaust gas comprises platinum in combination with palladium, with the palladium content being lower than in the upstream catalytic converter.

7. A catalytic converter system according to claim 5, characterized in that the catalyst coating of that catalytic converter which is downstream in the flow direction of the exhaust gas comprises only platinum as the catalytically active component.

8. A catalytic converter system according to claim 4, characterized in that the catalyst coating of the first and/or second catalytic converter also comprises zeolites.

9. A method of using the catalytic converter system according to claim 1 in the exhaust section of a diesel engine for heating up the lean exhaust gas to a temperature between 500 and 700° C. downstream of the final catalytic converter by means of the combustion of fuel or unburned hydrocarbon components from the engine on the catalytic converters.

10. The method according to claim 9, characterized in that the fuel is injected into the exhaust-gas flow upstream of the first catalytic converter by means of the dosing device.

11. The method according to claim 9, characterized in that the unburned fuel components in the exhaust gas are generated by means of a post-injection of fuel into the cylinders of the diesel engine.

12. The method according to claim 9, wherein said soot filter is regenerated by exposing said soot filter to, hot exhaust-gas flow generated by the catalytic converter system.

* * * * *